United States Patent Office 3,332,407
Patented July 25, 1967

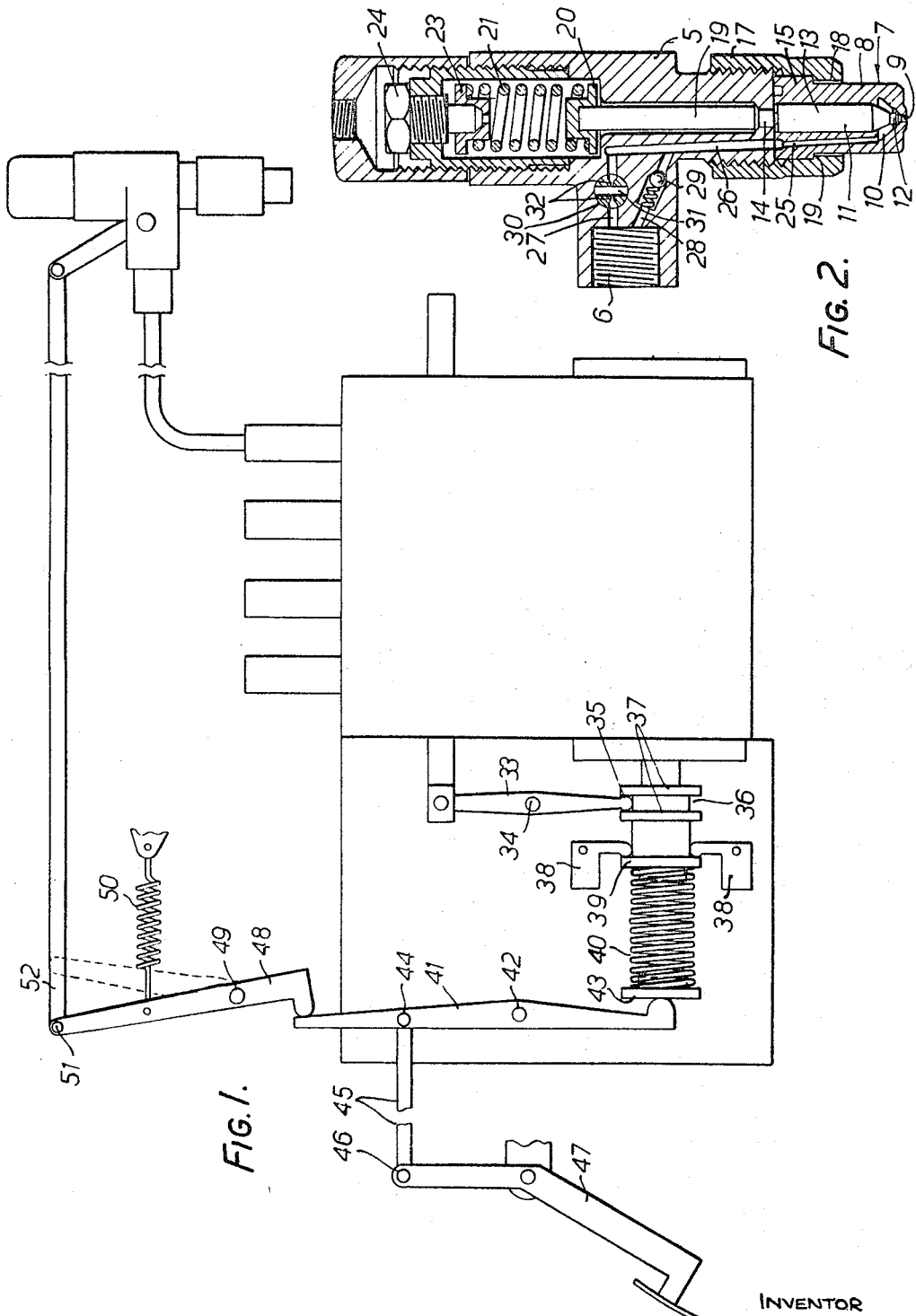

3,332,407
FUEL INJECTION APPARATUS FOR INTERNAL
COMBUSTION ENGINES
William Murray Scott, Brighton, England, assignor to
Ricardo & Co., Engineers (1927) Limited, London, England, a company of Great Britain
Filed Oct. 22, 1965, Ser. No. 501,667
Claims priority, application Great Britain, Mar. 25, 1965,
12,747/65
1 Claim. (Cl. 123—140)

This invention relates to fuel injection apparatus for internal combustion engines of the liquid fuel injection compression ignition type and of the kind comprising fuel delivery means, usually in the form of, and hereinafter for convenience assumed to be a reciprocating fuel pump, arranged to deliver fuel in predetermined quantities at appropriately timed intervals to at least one fuel injection device of the type which includes a nozzle, and a valve (herein called the injection valve) controlling the flow of fuel through the nozzle and so arranged as to be opened automatically during each injection period by the fuel pressure in a pressure chamber in the injection device, usually adjacent to the injection orifice or orifices, to which chamber the pump delivers the fuel.

One of the disadvantages of reciprocating internal combustion engines of the liquid fuel injection compression ignition type (and particularly those of relatively small capacity as are used in road vehicles) as compared with engines of the vapourised charge spark ignition type is that they tend to be noisy, particularly when idling and at low speeds.

Research into the cause of the noisy operation has shown that a substantial proportion of the noise, including the well known "diesel knock" appears to result from the high rate of injection inherent in existing injection systems, augmented in some cases by the fact that at the delivery pressures employed there is appreciable volumetric elasticity in the part of the system between the pump and the injection device which tends to delay the injection while pressure builds up in this part of the system until the injection valve opens, whereupon injection begins at a high volumetric rate. Moreover in existing systems there is a substantial delay between the beginning of injection and the inititaion of burning, and the result, which is attributed to one or both of these causes, is that when burning begins, there is a rapid initial pressure rise in the engine cylinder and consequent noisy operation. It has been found that if the rate of the initial pressure rise can be reduced, as by reducing the initial rate of injection and/or the delay between the beginning of injection and the beginning of burning, the noise is similarly reduced, and various proposals have, therefore, been made which aim at reducing the rapidity of the initial pressure rise. One such proposal is the injection into the air charge prior to the main injection (e.g. during the induction or compression period) of a small quantity of fuel which is insufficient in itself to cause an appreciable pressure rise but which ignites before the main injection begins so that the burning of the fuel then injected tends to start with little delay. This proposal, which is usually called "pilot injection," has not however been entirely successful in its purpose. It has been found for example that at the injection pressures required in practice it is difficult to provide for such a pilot injection in advance of the main injection whether there is a time interval between the pilot injection and the main injection or not, due to the volumetric elasticity referred to, which causes the fuel line between the pump and the pressure chamber of the injector to act to some extent as a hydraulic accumulator so that when the injection valve opens the initial rate of injection is too high for quiet engine operation.

The present invention has for its object to provide a form of fuel injection apparatus of the general kind referred to which will represent a still further improvement over existing systems.

Fuel injection apparatus for an internal combustion engine of the liquid fuel injection compression ignition type including a speed responsive governor driven by the engine, according to the present invention comprises a fuel injection device including a nozzle having at least one injection orifice, a pressure chamber, and a valve controlling the flow of fuel through the nozzle and arranged to be opened automatically during each injection period by the pressure in said pressure chamber, fuel delivery means arranged to deliver fuel in measured quantities at appropriately timed intervals, passage means for the delivery of fuel from said delivery means to said pressure chamber including a passage of relatively large cross-sectional area and a passage of relatively restricted cross-sectional area, change-over valve apparatus having a normal power position in which it permits flow of fuel through said passage of relatively large cross-sectional area, and a restricted power position in which it causes the fuel to flow through said passage of restricted cross-sectional area, control means for varying the quantity of fuel delivered by said fuel delivery means during each injection period, a control member arranged to change the setting of the speed responsive governor to vary the speed at which it tends to maintain the internal combustion engine, and an inter-connection between said control member and the change-over valve apparatus whereby the changeover valve apparatus is caused to occupy its normal power position for governor settings at which the governor tends to maintain the internal combustion engine at a relatively high speed and to occupy its restricted power position for governor settings at which the governor tends to maintain the engine at a relatively low speed.

An arrangement according to the invention is shown somewhat diagrammatically by way of example in the accompanying drawings, in which:

FIGURE 1 is a partly diagrammatic view showing one form of fuel injection apparatus according to the invention, and FIGURE 2 is a cross-section on an enlarged scale through the fuel injection device embodied in the arrangement shown in FIGURE 1.

In the form of apparatus shown in FIGURE 1 a fuel pump, indicated diagrammatically at 1, is controlled by a control member 2 transverse movement of which controls directly in known manner the fuel delivered on each delivery stroke. The pump 1 is arranged to deliver fuel in known manner through fuel delivery passages to fuel injection devices one of which is shown at 3. The fuel injection device 3, which is shown in detail in FIGURE 2, comprises a body part 4 in which is formed a passage 6 constituting a continuation of the main delivery passage 4 and by which fuel is delivered through further passages hereinafter described to a nozzle assembly indicated generally at 7. The nozzle assembly comprises a nozzle member 8 having formed therein a main injection orifice 9 opening out of a pressure chamber 10 in which lies the lower end of a valve member 11 having a valve part 13 which, when the valve member 11 is in its closed position, engages a seating so as to close the orifice 9. The stem part 13 of the valve member 11 slides with a close sliding fit within a bore within the nozzle member 8 and is provided with a projection 14.

The upper part 15 of the nozzle member 8 is clamped to the main body part 5 of the injection device by a screwthreaded clamping member 17 the lower end of which has an inwardly directed flange 18 engaging a shoulder 19 on the part 16.

The main body part 5 has a central bore into which projects the projection 14 on the valve member 11 and in which lies and can slide a push rod 19 the upper end of which carries a thrust collar 20 on which acts the lower end of a compression spring 21 the upper end of which bears against a thrust member 23 which in turn is acted upon by an adjustable screw 24. Thus the valve member 11 is continuously urged downwards by the spring 21 but can be moved upwardly against the action of this spring, so that the valve part 12 leaves its seating, if and when fuel at sufficient pressure is delivered to the pressure chamber 10.

Fuel is delivered to the pressure chamber 10 via a passage 25 in the nozzle member 8 a passage 26 in the main body part 5 and a passage 27 communicating with the inlet passage 6. A relief passage 28 controlled by a spring-pressed non-return valve 29 extends in parallel with the passage 27. The passage 27 is controlled by a change-over valve 30 capable of being rocked about its axis through 90°. The valve 30 has formed therein a main passage 31 which, when the valve occupies a position displaced by 90° from the position shown in FIGURE 2, permits free flow of fuel from the pump delivery passage 6 to the passage 26, whereas when the valve occupies the position shown in FIGURE 2 communication between the pump delivery passage 6 and the passage 26 is effected solely through a pair of ports indicated at 32, which communicate with one another across the passage 31, and constituted a restricted passage, the passage 31 in this position of the valve 30 being closed at its ends.

The control member 2 of the fuel pump 1 is connected to one end of a lever 33 pivoted at 34 and having its other end 35 located in a groove 36 in the sliding collar 37 of a speed responsive governor device driven in known manner by the engine and having centrifugal weights 38 which act in known manner on a collar 39 in opposition to a compression spring 40. The setting of the compression spring 40 is variable in known manner by a lever 41 pivoted at 32 and acting on the abutment 43 against which bears the end of the spring 40 remote from the collar 39, the lever 41 being connected at 44 to one end of a link 45 the other end of which is connected at 46 to a foot pedal 47 arranged to be foot-operated, e.g. by the foot of the driver of a vehicle driven by the internal combustion engine. The upper end of the lever 41 is arranged to act upon the lower end of a lever 48 pivoted at 49 and acted upon by a tension spring 50, the upper end of the lever 48 being connected at 51 to one end of a link 52 the other end of which is connected to the lever 33.

In the arrangement shown the foot control 47 controls in known manner the setting of the governor spring 40 so as to vary as required the governed speed, that is to say the speed at which the governor attempts to maintain the engine, while also actuating in a manner according to the invention the valve 30 so that at governor settings representing the upper part of the governed speed range the main delivery passage 31 is maintained open while for governor settings representing the lower part of the governed speed range the passage 31 is closed and the ports 32 open.

It will be understood that the dimensions of the various passages are such that on movement of the valve 30 from the position shown in FIGURE 2 to the position in which the passage 31 is fully open, the passage 31 will begin to open before the ports 32 are closed.

What I claim as my invention and desire to secure by Letters Patent is:

Fuel injection apparatus for an internal combustion engine of the liquid fuel injection compression ignition type comprising a fuel injection device including a nozzle having at least one injection orifice, a pressure chamber, and a valve controlling the flow of fuel through the nozzle and arranged to be opened automatically during each injection period by the fuel pressure in said pressure chamber fuel delivery means arranged to deliver fuel in measured quantities at appropriately timed intervals, passage means for the delivery of fuel from said delivery means to said chamber including a passage of relatively large cross-sectional area and a passage of relatively restricted cross-sectional area, change-over valve apparatus having a normal power position in which it permits flow of fuel through said passage of relatively large cross-sectional area and a restricted power position in which it causes the fuel to flow through said passage of restricted cross-sectional area, control means for varying the quantity of fuel delivered by said fuel delivery means during each injection period, a speed responsive governor acting on said control means, a control member arranged to change the setting of said speed responsive governor to vary the speed at which it tends to maintain the internal combustion engine, and an interconnection between said control member varying the setting of the speed responsive governor and the change-over valve apparatus whereby the change-over valve apparatus is caused to occupy its normal power position for governor settings at which the governor tends to maintain the internal combustion engine at a relatively high speed and to occupy its restricted power position for governor settings at which the governor tends to maintain the engine at a relatively low speed.

References Cited

UNITED STATES PATENTS 2,143,168   1/1939   Pedersen _____ 123—140
2,190,051   2/1940   Tuscher _____ 123—140

MARK NEWMAN, *Primary Examiner.*

L. M. GOODRIDGE, *Assistant Examiner.*